United States Patent
Heckman

[15] 3,637,403

[45] Jan. 25, 1972

[54] ENHANCEMENT OF THE FLAVOR OF FOODSTUFFS

[72] Inventor: Robert A. Heckman, Winston-Salem, N.C.

[73] Assignee: R. J. Reynolds Tobacco Company, Winston-Salem, N.C.

[22] Filed: Apr. 28, 1969

[21] Appl. No.: 819,952

[52] U.S. Cl. .......................................99/140 R, 260/347.8
[51] Int. Cl. ..........................................A23l 1/22, A23l 1/26
[58] Field of Search................................99/140; 260/347. B

[56] References Cited

OTHER PUBLICATIONS

Ina et al. Isolation & Structure Elucidation of Theaspirone, a Component of Tea Essential Oil; Tetrahedron Letters; No. 23; pp. 2777– 2780; Apr. 1968

*Primary Examiner*—Morris O. Wolk
*Assistant Examiner*—Barry S. Richman
*Attorney*—Pendleton, Neuman, Williams & Anderson

[57] ABSTRACT

Enhancement of the flavor of foodstuffs is achieved by incorporating therewith a small amount of 1-oxa-8-oxo-2,6,10,10-tetramethyl-spiro[4,5]-6-decene.

4 Claims, No Drawings

ENHANCEMENT OF THE FLAVOR OF FOODSTUFFS

This invention relates to the enhancement of the flavor of foodstuffs.

In accordance with the present invention the flavor of foodstuffs is enhanced by incorporation therewith of a small amount of the compound 1-oxa-8-oxo-2,6,10,10-tetramethylspiro[4,5]6-decene, which compound is known as theaspirone and has the following structure:

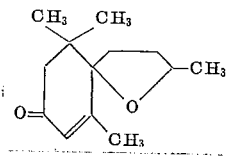

Theaspirone can be synthesized from 4-(1-hydroxy-4-oxo-2,6,6-trimethyl-2-cyclohexen-1-yl)-3-buten-2-one, for simplicity designated 1-hydroxy-4-keto-α-ionone, which compound is disclosed and claimed in U.S. Pat. No. 3,410,908.

SYNTHESIS OF THEASPIRONE a. Preparation of 4-(1-hydroxy-4-keto-2,6,6-trimethyl-2-cyclohexen-1-yl)-3-buten-2-ol To 5.56 grams of 1-hydroxy-4-keto-α-ionone (25 mmole) in 30 milliliters of methanol was slowly added 0.265 gram (7 mmole) of sodium borohydride using magnetic stirring. The mixture was heated under reflux for 1.5 hours, cooled, then it was diluted with 2 milliliters of water, followed by sufficient 0.5N hydrochloric acid to render the solution only slightly basic. Most of the methanol was evaporated in vacuo and the oil that resulted was poured into salt solution and further acidified with 2N hydrochloric acid. After extraction with chloroform the extract was dried over anhydrous sodium sulfate and evaporated. This yielded 5.70 grams of colorless oil. Trituration of the crude oil with ether-pentane afforded several crops of white, crystalline solid, (1) 2.1 grams, melting point 104°–106°; (2) 0.90 gram, melting point 99°–102°; (3) 0.26 gram, melting point 111°–113°; and (4) 0.28 gram, melting point 79°–85°. These crops were isomers or isomeric mixtures of 4-(1-hydroxy-4-keto-2,6,6-trimethyl-2-cyclohexen-1-yl)-3-buten-2-ol. The first crop showed λmax 3.04, 6.02, 6.20, 8.88, 9.30, 9.67, 9.76, 10.18 and 10.26μ (nujol). The third crop exhibited λmax 2.91, 3.00, 6.06, 6.17, 8.82, 9.09, 9.50 and 10.25μ (nujol). The remaining crops appeared by infrared analysis to be largely mixtures of crops (1) and (3). The nuclear magnetic resonance spectra (CDCl$_3$) of crops (1) and (3) were virtually identical; absorptions were noted at τ 9.05 $s$,6), 8.70 ($d$,3,$J$=7Hz.), 8.10 ($s$,3), 7.90 ($s$,2), 7.68 ($m$,2), 5.60 ($m$,1), and 4.15 ($s$,3). The mass spectra of crops (1) and (3) were nearly identical and showed $m/e$ 224, 222, 206, 204, 191, 168, 150, 134 and 124.

b. Preparation of 4-(1-hydroxy-4-keto-2,6,6-trimethyl-2-cyclohexen-1-yl)-butan-2-ol A small amount of platinum oxide was prereduced in 10 milliliters of absolute ethanol in a hydrogenator. A solution of 1.12 grams (5 mmole) of the combined crystalline mixtures from above in 10 milliliters of ethanol was injected into the flask by means of a syringe. The sample consumed 1.15 milliliters of 1 M sodium borohydride solution (used for external hydrogen generation, theory = 1.25 milliliters) after 2 hours. Filtration of the catalyst on a Celite bed, followed by evaporation of the filtrate, yielded 1.29 grams of an oil.

The oil was then chromatographed on 15 grams of silicic acid using low percentages of methanol in chloroform. A group of fractions eluted with 2 percent methanol in chloroform were combined (4-(1-hydroxy-4-keto-2,6,6-trimethyl-2-cyclohexen-1-yl)-butan-2-ol, 0.51 gram); this material showed λmax 2.93, 6.02, 6.15, 8.13, 8.45, 9.00 (broad), 9.55 and 9.78μ (liquid film). Mass spectral analysis showed peaks at $m/e$ 226 (M+), 208 (M+–H$_2$O), 184, 170, 153, 152, 110, 85 and 83. Nuclear magnetic resonance absorptions (CDCl$_3$) were noted at τ 8.97 ($s$,3), 8.90 ($s$,3), 8.81 ($d$,3,$J$6.5Hz.), 7.95 ($s$,3), 7.65 ($m$,2), 6.20 ($m$,1), 6.10 ($s$,2) and 4.17 ($s$,1).

c. Preparation of 1-oxa-8-oxo-2,6,10,10-tetramethylspiro[4,5]6-decene

The hydrogenated diol (4-(1-hydroxy-4-keto-2,6,6-trimethyl-2-cyclohexen-1-yl)-butan-2-ol, 0.41 gram) was dissolved in 1.6 milliliters of dimethyl sulfoxide and heated in an oil bath at 166° for 2.25 hours (gas-liquid chromatographic analysis indicated conversion was essentially complete in about 2 hours). To the cooled mixture was added 15 milliliters of water and 15 milliliters of pentane; after separation of the layers the aqueous portion was extracted twice more with pentane and the combined pentane extracts were dried over sodium sulfate and evaporated. This gave 167 milligrams of yellow oil (theaspirone) that showed the following spectral data: infrared (liquid film) 6.03, 6.19, 9.13, 9.27, 11.04 and 11.42μ; nuclear magnetic resonance (CDCl$_3$) τ 9.03–8.94 (6.3 peaks at 9.03, 8.99 and 8.94 of relative intensities 1:2:1), 8.73 ($d$,3,$J$=5.8Hz.), 8.03 ($d$,3,$J$=1.5Hz.), 7.7 ($s$,2), 5.78 ($m$,1) and 4.27 ($q$,1,$J$1.5 Hz.), mass spectrum $m/e$ 208, 193, 166, 165, 152, 123, 110 and 96. Gas-liquid chromatographic analysis of the oil showed equal amounts of theaspirone and its geometrical isomer.

In accordance with this invention theaspirone is utilized with any food or drink of which it is desired to enhance the flavor and elegance thereof. Accordingly, the term "foodstuffs" as used herein embraces both solid foods and drinking liquids which may have little or no food value. For example, the above compounds can be utilized to flavor or season snack foods such as potato or corn chips, puffed produces, crackers and the like; cereals and processed cereals such as corn, wheat, rice and flour; vegetables and processed vegetables such as corn, carrots, potatoes, frozen corn, and dehydrated potatoes; seasonings such as imitation butter flavor, table salt and monosodium glutamate; fats and oils such as cotton seed oil, soybean oil, olive oil and peanut oil; emulsified fats and oils such as butter and margarine; dairy products such as cheese; juices, drink concentrates, soft drinks and the like; candies, processed meat products, desserts and so forth.

The the aspirone is utilized with foodstuffs in relatively small amounts and the specific amount to employ in each case will depend upon the flavor enhancement desired as well as processing contemplated for the foodstuff. In general, theaspirone is employed in foodstuffs in amounts ranging from about 0.001 to 0.1 percent by weight. Due to the possibility of volatilization, greater amounts are usually preferred with foodstuffs which undergo heating or cooking after the flavor enhancer is added thereto.

The flavor enhancer employed in accordance with this invention can be incorporated with foodstuffs in any convenient manner. Thus, it can be applied to the surface of a solid food by spraying or dipping the food product with a suitable solution of the additive such as a water, alcohol or oil solution or suspension thereof. Also, the theaspirone can be incorporated with foodstuffs by means of a carrier such as, for example, flour or salt, which is then added to the food. A flavor concentrate such as a butter or margarine containing the theaspirone can likewise be employed for incorporation of the additive and the additive can be incorporated with foodstuffs before or after processing, that is, before cooking or baking of the food product.

The following specific examples illustrate the invention and the advantages thereof.

EXAMPLE 1

Cooked Chocolate Pudding

Samples of a commercial chocolate pudding were prepared as per package directions and evaluated with 0.001-gram theaspirone per 3⅝ ounces (115 grams) pudding added thereto before cooking against a control pudding. A panel of eight experts composed of professional food technologists and flavor chemists with trained acuity expressed preferences as follows:

| | Preference |
|---|---|
| Chocolate pudding with theaspirone | 4 |
| Chocolate pudding control | 1 |
| No difference | 3 |

EXAMPLE 2

Cooked Butterscotch Pudding

Samples of a commercial butterscotch pudding were prepared as per package directions and evaluated with 0.001-gram theaspirone per 4-ounces pudding added thereto before cooking against a control pudding. A panel of 10 flavor experts expressed preferences as follows:

| | Preference |
|---|---|
| Butterscotch pudding with theaspirone | 6 |
| Butterscotch pudding control | 1 |
| No difference | 3 |

The panel concluded that the theaspirone brought out a slight nut character in the foodstuff.

EXAMPLE 3

Lime Congealed Dessert

A lime flavor congealed dessert consisting of sugar, gelatin, adipic acid, sodium citrate, fumaric acid, a lime flavoring with BHA added as a preservative and U.S. certified food color was prepared by dissolving in hot water and chilling until set. Comparison of such a lime flavored congealed dessert containing 0.002-gram theaspirone per 3-ounces dry weight of product against a control indicated that theaspirone enhanced the lime flavor and added a slight tartness as evaluated by a panel of 10 experts.

| | Panel Preference |
|---|---|
| Lime-congealed dessert with theaspirone | 6 |
| Lime-congealed dessert control | 1 |
| No difference | 3 |

EXAMPLE 4

Black Cherry Congealed Dessert

A congealed dessert consisting of sugar, gelatin, adipic acid, sodium citrate, an imitation black cherry flavor and U.S. certified food color containing 0.002-gram theaspirone per 3-ounces dry weight was prepared as in example 3 and evaluated against a control. Professional expert evaluation indicated that the formulation containing theaspirone was sweeter and better balanced in character than the control.

| | Panel preference |
|---|---|
| Black cherry congealed dessert with theaspirone | 6 |
| Black cherry congealed dessert control | 3 |
| No difference | 1 |

EXAMPLE 5

Maple-Fudge Syrup

A maple-fudge flavored syrup consisting of corn and sugar syrups, water and an imitation maple-fudge flavor containing 0.002-gram theaspirone per 8 ounces of syrup was evaluated against a control. Expert evaluation indicated that theaspirone appeared to give a flavor enhancement.

| | Panel Preference | Flavor Enhancement |
|---|---|---|
| Maple-fudge syrup with theaspirone | 4 | 5 |
| Maple-fudge syrup control | 3 | 2 |
| No difference | 3 | 2 |

EXAMPLE 6

Tomato Cocktail

Theaspirone (0.001 gram) was added to 8 ounces of a commercial tomato cocktail drink and evaluated against a control sample.

Expert flavor evaluation indicated theaspirone imparted a distinct enhancement to the tomato flavor.

| | Panel preference |
|---|---|
| Tomato cocktail with theaspirone | 6 |
| Tomato cocktail control | 2 |
| No difference | 1 |

EXAMPLE 7

Theaspirone (0.01 gram) was added to 8 ounces of a commercial "Hersey's Chocolate Syrup" topping and evaluated by an expert panel against a control. Expert evaluation indicated that theaspirone brought out a bitter sweet chocolate character in the topping and was judged an improvement by those who preferred a bitter chocolate product.

Those modifications and equivalents which fall within the spirit of the invention are to be considered a part thereof.

I claim:

1. A foodstuff devoid of natural or synthetic tea essential oil having added thereto 1-oxa-8-oxo-2,6,10,10-tetramethyl-spiro[4,5]6-decene in an amount to enhance the flavor of the foodstuff.

2. A foodstuff in accordance with claim 1 wherein the amount of the 1-oxa-8-oxo-2,6,10,10-tetramethyl-spiro[4,5]-6-decene added to the foodstuff is between about 0.001 and 0.1 percent by weight.

3. A process of enhancing the flavor and/or elegance of foodstuffs devoid of natural or synthetic tea essential oil which comprises incorporating therewith a small amount of 1-oxa-8-oxo-2,6,10,10-tetramethyl-spiro[4,5]-6-decene.

4. A process in accordance with claim 3 wherein the 1-oxa-8-oxo-2,6,10,10-tetramethyl-spiro[4,5]-6-decene is incorporated in an amount between about 0.001 and 0.1 percent by weight.

* * * * *